United States Patent
Netanel et al.

(10) Patent No.: US 10,917,298 B2
(45) Date of Patent: Feb. 9, 2021

(54) GLOBAL DEVICE MANAGEMENT ARCHITECTURE FOR IOT DEVICES WITH REGIONAL AUTONOMY

(71) Applicant: Aeris Communications, Inc., San Jose, CA (US)

(72) Inventors: Eran Netanel, Belmont, CA (US); Narendra Sharma, Sunnyvale, CA (US); Yixiang Chen, Palo Alto, CA (US); Manish Mishra, Foster City, CA (US)

(73) Assignee: Aeris Communications, Inc., San Jose, CA (US)

(*) Notice: Subject to any disclaimer, the term of this patent is extended or adjusted under 35 U.S.C. 154(b) by 0 days.

(21) Appl. No.: 16/374,979

(22) Filed: Apr. 4, 2019

(65) Prior Publication Data

US 2019/0312778 A1    Oct. 10, 2019

Related U.S. Application Data

(60) Provisional application No. 62/653,055, filed on Apr. 5, 2018.

(51) Int. Cl.
*H04L 12/24*     (2006.01)
*H04L 29/08*     (2006.01)
*H04W 12/06*     (2021.01)
*H04W 12/08*     (2021.01)

(52) U.S. Cl.
CPC .......... *H04L 41/0823* (2013.01); *H04L 67/12* (2013.01); *H04W 12/06* (2013.01); *H04W 12/08* (2013.01)

(58) Field of Classification Search
CPC ............. H04L 41/0823; H04L 63/0823; H04L 63/101; H04L 67/12; H04W 12/06; H04W 12/08; H04W 4/70
See application file for complete search history.

(56) References Cited

U.S. PATENT DOCUMENTS

| | | |
|---|---|---|
| 9,716,595 B1 | 7/2017 | Kravitz et al. |
| 9,781,602 B1 | 10/2017 | Girdhar et al. |
| 2016/0105305 A1 | 4/2016 | Pignataro et al. |

(Continued)

FOREIGN PATENT DOCUMENTS

WO    WO 2018009160 A1    1/2018

OTHER PUBLICATIONS

International Search Report from International Application No. PCT/US19/025980 dated Aug. 16, 2019.

(Continued)

*Primary Examiner* — Kan Yuen
(74) *Attorney, Agent, or Firm* — Brundidge & Stanger, P.C.

(57) ABSTRACT

A computer-implemented method and system for global device management architecture with regional autonomy for devices on a cellular network are disclosed. The computer implemented method for optimizing device management architecture for IoT devices includes providing device information to a server in a master node for registering a device with the master node; providing rules to assign the device to at least one node based on the device information; assigning the device to the at least one node in response to the rules; and automatically configuring the device to connect the device to the assigned node.

51 Claims, 11 Drawing Sheets

(56) References Cited

U.S. PATENT DOCUMENTS

| | | | |
|---|---|---|---|
| 2016/0128043 A1 | 5/2016 | Shuman et al. | |
| 2016/0198465 A1* | 7/2016 | Britt | H04M 15/49 |
| | | | 455/450 |
| 2017/0078875 A1* | 3/2017 | Muhanna | H04L 9/3271 |
| 2017/0111858 A1* | 4/2017 | Azizi | H04W 52/0212 |
| 2017/0180208 A1 | 6/2017 | Smith et al. | |
| 2017/0280351 A1 | 9/2017 | Skaaksrud | |
| 2018/0183882 A1 | 6/2018 | Flynn et al. | |
| 2018/0205762 A1 | 7/2018 | Panchbudhe et al. | |
| 2018/0234509 A1 | 8/2018 | Shah | |
| 2018/0375887 A1 | 12/2018 | Dezent et al. | |
| 2019/0037448 A1 | 1/2019 | Shan et al. | |

OTHER PUBLICATIONS

S. K. Mohapatra, "A Solution Framework for Managing Internet of Things (IoT)", International Journal of Computer Networks & Communications (IJCNC) vol. 8, No. 6, Nov. 2016, pp. 73-87.

Tom Keeley, "IoT to IoAT: Internet of Autonomous Things Devices Provides Solutions", Control Engineering, Apr. 30, 2016, pp. 1-11.

* cited by examiner

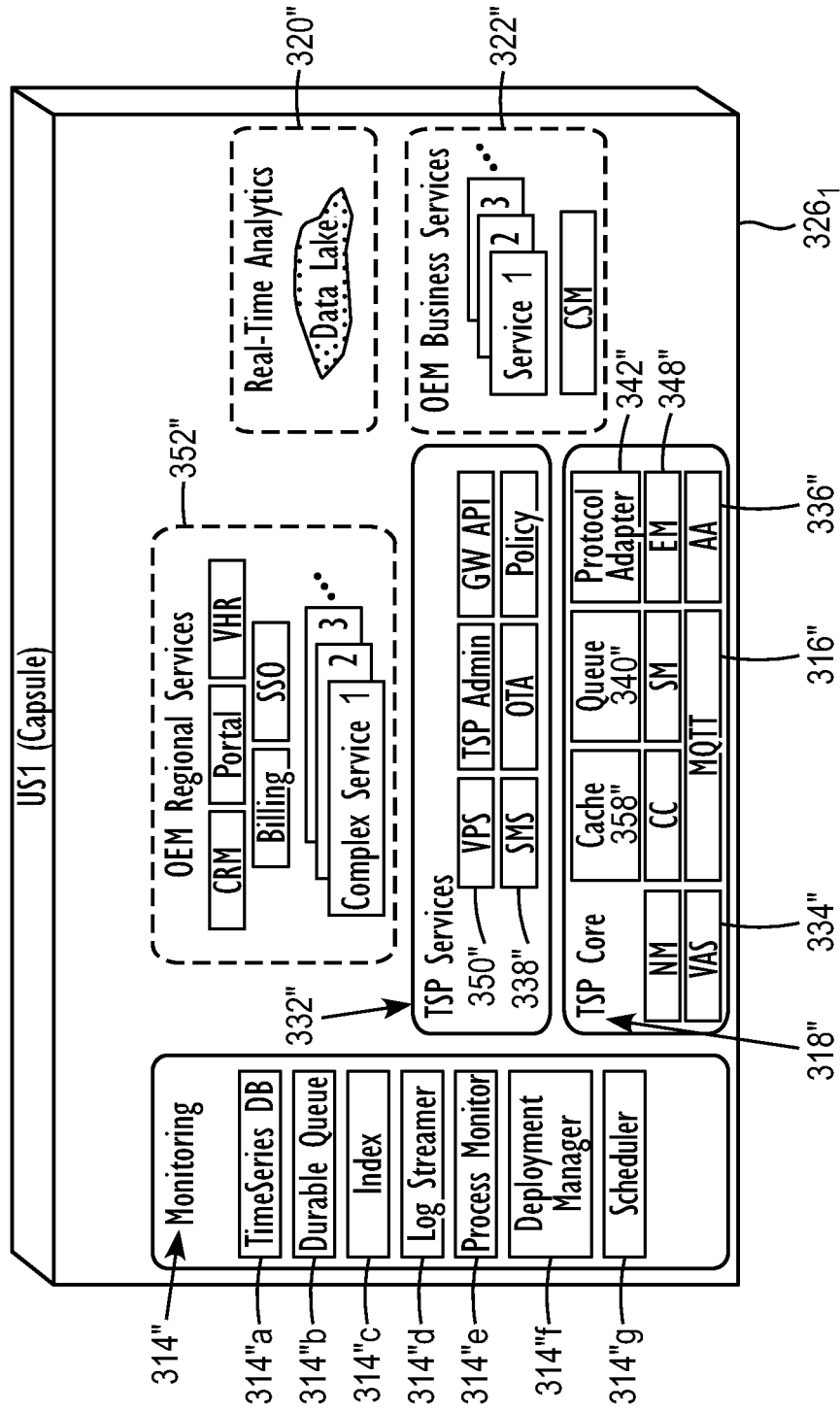

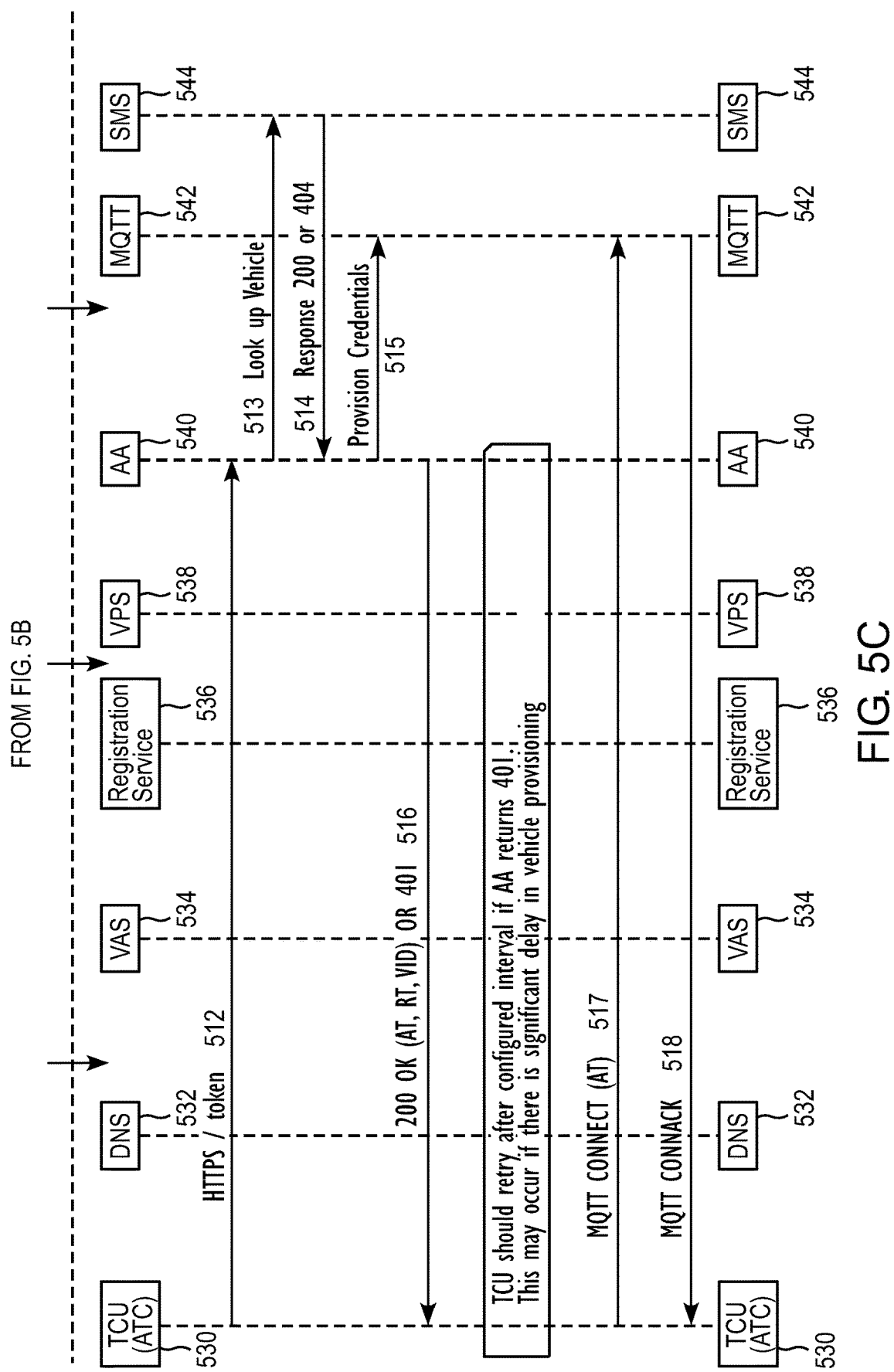

GLOBAL DEVICE MANAGEMENT ARCHITECTURE FOR IOT DEVICES WITH REGIONAL AUTONOMY

CROSS-REFERENCE TO RELATED APPLICATIONS

Under 35 USC 119(e), this application claims priority to U.S. provisional application Ser. No. 62/653,055, filed on Apr. 5, 2018, which is herein incorporated by reference in its entirety.

FIELD OF THE INVENTION

The present invention relates generally to cellular or wireless networks and more particularly to global device management architecture with regional autonomy for IoT/M2M devices connected to the cellular or wireless network.

BACKGROUND OF THE INVENTION

Many solutions for managing Internet-of-Things (IoT)/Machine-to-Machine (M2M) devices, particularly devices operating on moving machines, for example, vehicles, require for proper operation a method for managing such devices on a global basis while also allowing regional management of the devices and their applications.

SUMMARY OF THE INVENTION

A computer-implemented method and system for global device management architecture with regional autonomy for IoT devices on a cellular or other wireless network are disclosed. The computer-implemented method for optimizing device management architecture for IoT devices includes providing device information to a server in a master node for registering a device with the master node; providing rules to assign the device to at least one node based on the device information; assigning the device to the at least one node in response to the rules; and automatically configuring the device to connect the device to the assigned node.

The system for optimizing device management architecture for IoT devices includes a database structure including: one or more nodes, wherein each one of the one or more nodes comprises at least one server; a registration service module, wherein the registration service module registers a device in a database server of a master node using device information; and a rules engine, wherein the rules engine provides rules to assign the device to a node from one or more nodes based on the received device information; wherein the at least one server assigns the device to at least one node of the one or more nodes in response to the rules; and the device is automatically configured in response to the assignment to keep the device connected to the assigned at least one node.

In an embodiment, a computer program product for optimizing device management architecture for IoT devices is disclosed. The computer program product stored on a non-transitory computer readable medium includes a processor, and a memory in communication with the processor wherein the memory containing program instructions which, when executed by the processor, perform the following operations, including providing device information to a server in a master node for registering a device with the master node; providing rules to assign the device to at least one of the one or more nodes based on the device information; assigning the device to the at least one of the one or more nodes in response to the rules; and automatically configuring the device to connect the device to the assigned at least one of the one or more nodes.

BRIEF DESCRIPTION OF THE DRAWINGS

FIGS. 3A-3D illustrate an exemplary system and method for optimizing device management architecture for IoT devices according to one or more embodiments described herein.

FIGS. 5A, 5B and 5C illustrate an exemplary process for optimizing device management architecture for IoT devices according to one or more embodiments described herein.

DETAILED DESCRIPTION OF THE PREFERRED EMBODIMENT

Figure 1:
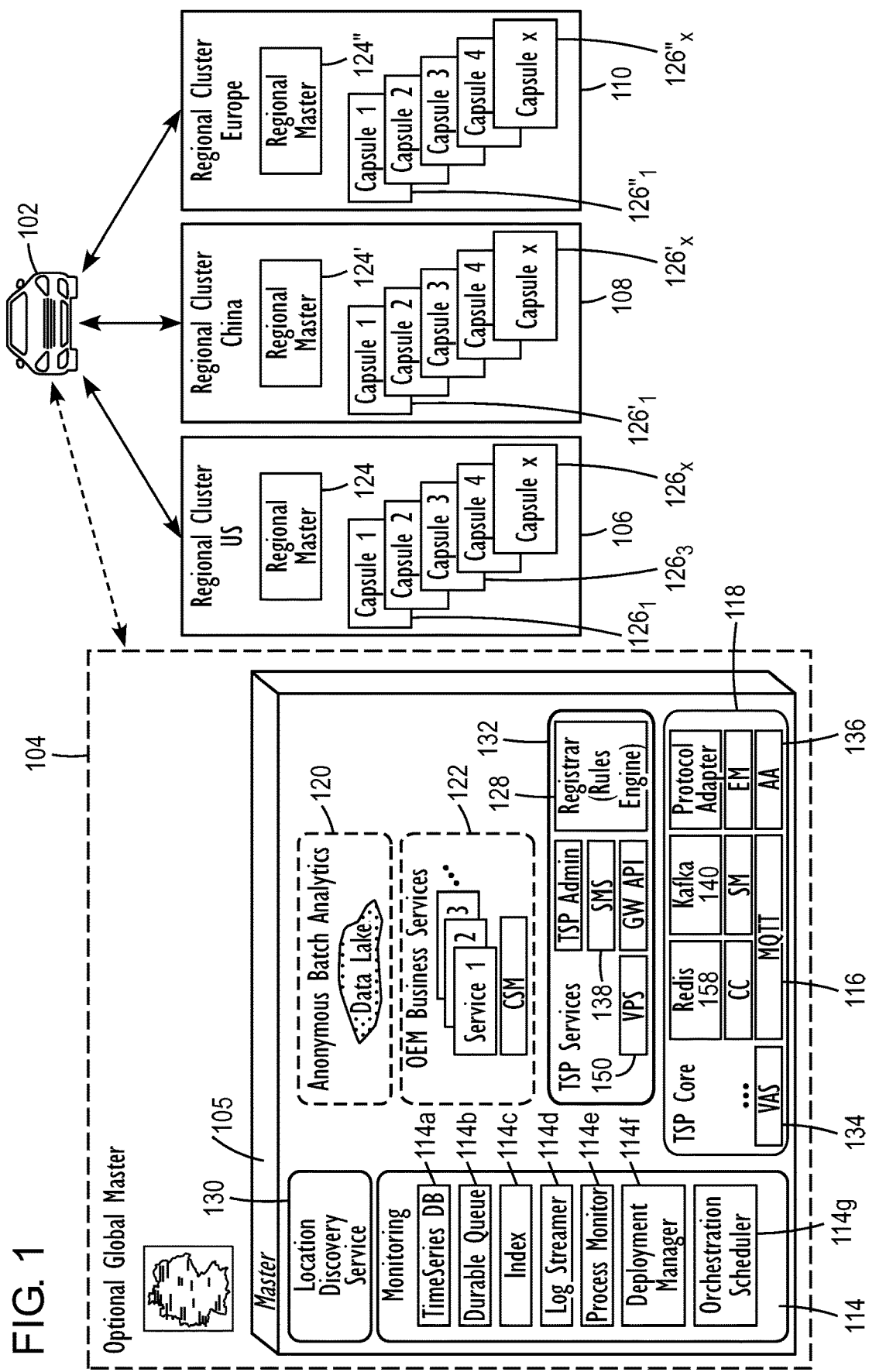
FIG. 1 is an overview diagram for the method and system for optimizing device management architecture for IoT devices according to an embodiment described herein.

To describe the features of the present invention in more detail, refer now to the following description in conjunction with the accompanying Figures.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Increasingly, machines are being connected to computer systems using devices that can communicate data over cellular or other wireless systems and where the data is used to execute business applications for management of the machines. These machines may be scattered through different regions of the world, and a method is needed that provides flexibility to adapt to the operational complexities presented by, for example, different network environments, different machine types, and a range of business rules and processes. These applications may include many applications operating on Internet-of-Things (IoT)/Machine-to-Machine (M2M) devices. In particular, those running on moving machines require this global as well as regional management of data. For example, vehicles are increasingly being connected to networks, and data from these vehicles is an integrated part of business management. The processes for managing these moving devices must be flexible in order to adapt to different network environments and business rules. In an embodiment, the IoT devices or M2M devices may include stationary devices, e.g., devices/appliances used in homes, e.g., refrigerators, manufacturing, other industries, e.g., squadrons of drones, medical devices, etc.

The following embodiments disclose, for example, a computer-implemented method and system for global device management architecture with regional autonomy for IoT devices on a cellular or other wireless network. According to one embodiment, the computer-implemented method for optimizing device management architecture for IoT devices includes providing device information to a server in a master node for registering a device with the master node; providing rules operated by a processor on or through that server to assign the device to a node for management of a subset of devices based on the device information, such as geographic location; using rules to assign the device to at least one node based on the device information; assigning the device to a node in response to the rules; and automatically configuring the device in response to the rules to connect the device to the assigned node.

According to another embodiment, the system for optimizing device management architecture for IoT devices includes a database structure including: one or more nodes, wherein each one of the one or more nodes comprises at least one server; a registration service module, wherein the registration service module registers a device in a database server of a master node using device information; and a rules engine, wherein the rules engine provides rules to assign the device to a node from one or more nodes based on the received device information; wherein the at least one server assigns the device to at least one node of the one or more nodes in response to the rules; and the device is automatically configured in response to the assignment to keep the device connected to the assigned at least one node.

According to yet another embodiment, a computer program product for optimizing device management architecture for IoT devices is disclosed. The computer program product stored on a non-transitory computer readable medium for optimizing device management architecture for IoT devices includes a processor, and a memory in communication with the processor wherein the memory contains program instructions which, when executed by the processor, perform the following operations, including providing device information to a server in a master node for registering a device with the master node; providing rules to assign the device to a node based on the device information; using rules to assign the device to at least one node based on the device information; assigning the device to the at least one node in response to the rules; and automatically reconfiguring the device in response to the rules to keep the device connected to the assigned node.

For example, according to one embodiment that includes a vehicle, the device may include a telematics client, which may be a modular, in-vehicle software that is installed on the device and operates as an integral component of the telematics service platform for extending the telematics and connected vehicle services into the vehicle. The telematics client software may be designed to add flexibility to software embedded in other vehicle components, allowing it to address future compatibility requirements and adoption of different business rules that are customized for regional requirements, cloud requirements, generations of hardware, and network conditions.

The flexibility of management described above may be accomplished by using global architecture, e.g., deployment of a single device management solution architecture around the world, with different regions being autonomous in terms of collection, processing, and storage of data and the rules to be applied to that data. For example, data from vehicles within the U.S. may be separated from data from vehicles within China by using a differentiating database structure. In this way, the data from one region, e.g., subscriber or driver information, is not visible in another region due to privacy concerns among other things, and can be managed according to regional rules (such as identity of cloud host or availability of connected vehicle service functions). This may be achieved by using a single infrastructure schema that is replicated multiple times in different regions, and by "containerizing" within a region (also called a "regional domain node"). Containerizing within a region may allow each region or a part within the region that is containerized, e.g., regional domain node, to run as an independent system, and thus may provide autonomy with respect to certain aspects of device management. In an embodiment, each regional cluster may have a regional master node, also known as regional master capsule, and one or more domain nodes, also known as domain capsules, attached to the regional master node. Thus, a group of regional domain nodes/capsules along with the regional master node, may be called as a regional cluster. Thus, there may be three types of nodes including a global node, a regional master node and a regional node/capsule, where each of the nodes may further include a server or a collection of servers representing a logical entity and/or a database. A regional node may also be called a regional cluster including at least one regional master node and one or more regional domain nodes and/or regional nodes. In an embodiment, a regional node may include a regional master node. In an embodiment, a regional node may include a regional domain node.

Traditionally, for systems involving large amounts of data, the systems are designed to scale logically, both with respect to computing capacity and database capacity, in the same physical infrastructure by adding more nodes, leading to purely hardware-based scalability. However, pure hardware-based scalability may have some limitations, including hardware capacity, concentration of risk in a single location, and latency for communications across long distances. In addition, where groups of devices are subject to different rules, requiring the single location to execute different rules for different devices can lead to computing inefficiencies and errors. These limitations may be overcome by creating a full replication of the system outside of the original server, leading to a device management solution that provides scalability across different clusters according to selected criteria for assigning devices to clusters (e.g., different regions, different device types, different user types) using a combination of hardware in different clusters and algorithms for managing data and devices based on instructions executed both by one or more master databases or servers and by that separate hardware. This scalability based on assignment to separate clusters may also be optimized by providing a method by which devices can discover which cluster or master node they belong to.

In an embodiment, the server in master node surveys the devices during a registration process, such as by querying the master database for that device to determine, for example, which node a device belongs to, e.g., capsule 1. Alternatively, the registration process may be carried out in the regional master node directly, e.g., the server in the regional master node may survey the devices during a registration process, such as by querying the master database in that regional master node for that device to determine, for example, which node/capsule a device belongs to, e.g., capsule 1.

These nodes also known as capsules may be geographically based or may be designed based on some other criteria, for example, type of device, user information etc. These nodes or capsules may be a fully contained environment containing data only for that device and similar devices assigned using the same criteria, and whose number may be limited or predetermined per capsule by design.

If a device is not already assigned to a node, the logical rules in the master node, also known as master capsule, may direct it to assign devices to a node or capsule on the basis of specified criteria, which may include any of: make of the device, model of the device, year of manufacture, geographic location of the device, or a combination thereof. In an embodiment, the logical rules may include simple rules, e.g., in case of vehicles, odd vehicle identification number (VIN) vehicles may be assigned to one node and even VIN vehicles may be assigned to another node. The logical rules used for assignment of a device to particular node may be stored in a rule engine or outside the rule engine in a database or in a file system which may be separate from the database.

In an embodiment, the device may be a vehicle. While the device-based client software for the management solution may be deployed initially with default values, the complete client functionality and behavior may be rule-based and may be securely controlled remotely, for example, in the case of vehicles, by the telematics service provider (TSP). In an embodiment, changes to functionality may be driven by changing business rules via the TSP, in real-time and/or at any time, either to specific devices or to all devices assigned to the same node or cluster. The client may be defined as a telematics client or agent on the device.

Because different devices may require different behavior based on the criteria used for assigning the devices to a node (e.g., devices in China have one set of functionality and devices in Europe have a different set), using autonomous clusters for device management can make management of these devices both more efficient and more secure. In an exemplary embodiment pertaining to vehicle as a device, examples of business rules that may trigger changes to the behavior of the client software on the device may include any of vehicle year model and trim level capabilities, e.g., vehicles with WiFi capabilities vs. vehicles without WiFi capabilities; regional or location-based offerings, e.g., the ability to offer remote engine start in specific regions and in compliance with varying regional regulations; wireless network business arrangements e.g., home vs. roaming, restricting large over the air (OTA) traffic, e.g., download/upload of data to home network only, rules requiring that, due to cost of cellular connectivity, the device stay mostly disconnected while roaming, rules requiring that a device remain connected while within coverage of a home (non-roaming) cellular network, etc.; platform capacity planning, e.g., redirecting and anchoring the client from one cloud instance (capsule) to another; legal or other ability to process data from vehicle and owner using data analytics, e.g., analytics for dynamically reducing connection time and frequency of vehicle state reports to cloud; detecting behavioral changes; vehicle lifecycle, e.g., built, shipped, at dealer, sold, resold, scrapped, fleet etc.; ability or need to turn on or off certain functionalities; security procedures that may differ based on hosting environment, local country rules, etc., e.g., re-establishing security keys or changing in-vehicle firewall rules based on given triggers, periodically updating credentials based on security guidelines, or a combination thereof.

Stakeholders in a collected device management program may require that data be collected regarding device state and device events and reported over the network to a server for analysis, processing and action. Such data and reports may be required for safety, user experience, analytics, device or vehicle health and more. The criteria for determining which data about a vehicle or other device should be collected and reported to varying stakeholders, including connected device service providers, may vary depending on different business rules, for example, based on vehicle model year, geographic region, wireless network transport type or network operator, or even owner usage as discussed above. To ensure flexibility, a device management solution may be configured to treat a device as an abstracted list of logical sensors, each of which has collection/summation rules and reporting conditions rules. For example, data regarding change in state of vehicle doors may be collected by using rules such as collect ["door.front.right" "door.front.left" "door.back.right" "door.back.left" ] every time any door state changes, with a further rule requiring that the change in state be reported 30 seconds after "ignition=ON". Another example would be for reporting of charge status of a battery-powered device, such as an electric vehicle, where on collecting data showing that event "ev.gun=plugged" has occurred, then rules require a report ["ev.gun" "ev.charge" "ev.estimatedMiles" ]. The service provider for the device or vehicle management service may also wish to change the collection and reporting rules dynamically and deliver the new rules to the telematics client using a wireless communication.

Many programs for managing groups of devices today, such as for providing "connected vehicle services" to owners of automobiles produced by a certain manufacturer, are monolithic systems, where the system architecture interweaves all functional components (e.g., systems for data input and output, data processing, error handling, and user interface). However, monolithic systems have some drawbacks. A major drawback of a monolithic system is that generally the performance of such systems deteriorates as the number of users or devices under management increases. This performance degradation may mainly be due to poor mechanisms for management of the ability of different components to access the same records or with file handling across local area networks.

In an embodiment, the claimed invention may overcome these drawbacks by severing the connection between the home database and a regional database by sharding and breaking the database system into silos. These silos may then be structured such that they may not be too dependent on each other. The silos may also be structured so that data generated by devices assigned to one silo may not be shared with any other silo, which may also help with preserving data privacy. For example, a connected vehicle program could be structured so that user information that is generated for vehicles based in a jurisdiction with strict data privacy rules (e.g., Europe, China or Russia) may not leave the cluster for the country to which that vehicle is assigned. So, if a car that is first sold and used in China is then resold and used in Europe, or the owner relocates, the assignment for the vehicle may be changed to the cluster for Europe. After this reassignment, data collected from that vehicle will be stored in the European cluster, but that cluster will not be permitted to share it nor will the cluster in China be permitted to receive or store it. Similarly, data gathered from that vehicle in China, which is stored in the cluster for China, may not be permitted to be shared or transferred to the cluster for Europe.

Large device deployments may require very complex segmentation. Using connected vehicles as an example, an OEM also may be dealing with many different models, and the different feature packages of each model beyond managing vehicles of different model-years. Additionally, those models might be deployed to different geographical regions, each with its own vehicle and information regulatory environments—creating even greater complexity. Global device management with regional autonomy architecture may enable rapid deployment, modification, or removal of applications while maintaining security and overall functionality. This creates a more orchestrated vehicle connectivity experience designed to support the secure interchange between data sources and applications.

FIG. 1 is an overview diagram for the method and system 100 for optimizing database architecture for IoT devices according to an embodiment described herein. As illustrated in FIG. 1, once device 102 is manufactured, it may require global as well as regional management for proper operation of and management of applications running on it. For example, the ability to connect vehicles to networks for purposes of collecting and analyzing data and managing certain vehicle parameters is becoming essential for manufacturers. These manufacturers and any telematics service providers need flexibility to adapt to different network environments, business rules and processes. Device information for device 102 may be provided to a server in a global master node also known as global master capsule 104 to register the device with the master node 104. The server includes a database which may be local or remote.

In an embodiment, the IoT devices or M2M devices may include mobile devices, e.g., vehicles and/or stationary devices, e.g., devices/appliances used in homes, e.g., refrigerators, manufacturing, other industries, e.g., squadrons of drones, medical devices, etc.

As illustrated in FIG. 1, the global master node 104 and/or master node 105 is provided with different components to carry out the processes involved in connecting the device to assigned node illustrated in FIGS. 3A, 3B, 3C, 3D, 5A, 5B and 5C and described in detail in description accompanying FIGS. 3A, 3B, 3C, 3D, 5A, 5B and 5C. For example, the global master node 104 and/or master node 105 includes a domain name server (DNS) or a location discovery service 130; telematics service provider (TSP) core 118; telematics service provider (TSP) service 132; monitoring service 114; TSP core 118; anonymous batch analytics 120 and OEM business services 122. The OEM business services 122 and anonymous batch analytics 120 may be optional. In an embodiment, the OEM business services 122 and anonymous batch analytics 120 may reside within the master node 104 and/or 105 or may be external to the master node 104 and/or 105.

The master node 104 and/or 105 may respond dynamically to real-world conditions. For example, if a device moves from an area of logical node/capsule control to another, e.g., from one geographic region to another, it can be reassigned via over-the-air-updates to meet region or national compliance, a change in carriers, or a host of other issues that might occur.

The telematics service provider (TSP) core 118 may further include an authentication and authorization server (AA), message queuing telemetry transport (MQTT) 116 and vehicle activation service (VAS) 134.

The telematics service provider (TSP) service 132 may further include a subscription management service (SMS) 138 which may also be known as a transaction service provided for managing subscriptions based on transactions to the OEM; and registrar 128 also known as registration service module. The registrar 128 is provided with a rule engine, which may be within the registration service module or external to the registration service module. VAS, the vehicle activation service, 134 is responsible for completing the registration process with registrar 128 and assigning appropriate regional node to the vehicles.

The monitoring service 114 may further include Time-Series DB 114a, e.g., InfluxDB, Cassandra, MongoDB; Durable Queue 114b, e.g., Kafka, ActiveMQ, RabbitMQ; Index 114c, e.g., ElasticSearch, Solr; Log Streamer 114d, e.g., Logstash, Flume; Process Monitor 114e, e.g., Nagios, Munin; Deployment Manager 114f, e.g., Rancher; Orchestration Scheduler 114g, e.g., Cattle, Kubernetes.

The TSP core 118 may further include Cache 158, e.g., Redis or Hazelcast; Queue 140, e.g., Kafka, ActiveMQ, RabbitMQ.

Although exemplary products that may be used are listed here, a person skilled in the art readily understands that other products serving the same or similar functionality may be used. The global master node 104 and/or the master node 105 may also include, vehicle provisioning system (VPS) 150, SMS 138 holds vehicle master data in the regional capsule, and VPS 150 is responsible for provisioning the vehicle in the regional capsule SMS 138.

The global master node 104 and/or the master node 105 may be provided with a rules engine 128 that provides rules also known as logical rules to assign the device to a node based on the received device information. The global master node 104 and/or the master node 105 then assigns the device 102 to a node in response to the rules. The global master node 104 and/or the master node 105 thus directs the device 102 to connect to the assigned node, for example, a regional cluster, e.g. 106, 108, 110, based on the device information.

Alternatively, the device information for device 102 may be provided to a server in a regional master node 124 to register the device with the regional master node 124. Since the regional master node comprises components similar to that of the global master node 104 and/or the master node 105, a process similar to the one described above for global master node 104 and/or the master node 105 may be carried out by the regional master node 124.

In an embodiment, the logical rules may include simple rules, e.g., in case of vehicles, odd vehicle identification number (VIN) vehicles may be assigned to one node and even VIN vehicles may be assigned to another node. The logical rules used for assignment of a device to particular node may be stored in a rule engine or outside the rule engine in a database or in a file system which may be separate from the database.

Each regional cluster 106, 108, 110 may include a regional master node, 124, and one or more domain nodes or capsules, capsule 1 . . . capsule x $126_1$ . . . $126_x$ connected to the regional master node 124. The infrastructure used for this optimized database structure may be the same and may be replicated multiple times and by containerizing a region called as regional clusters 106, 108 and 110. Traditionally, for systems involving large amounts of data, the systems are designed to scale logically, both with respect to computing capacity and database capacity, in the same physical infrastructure by adding more nodes, leading to purely hardware-based scalability. However, pure hardware-based scalability may have some limitations, including hardware capacity, concentration of risk in a single location, and latency for communications across long distances. In addition, where groups of devices are subject to different rules, requiring the single location to execute different rules for different devices can lead to computing inefficiencies and errors. These limitations may be overcome by creating a full replication of the system outside of the original server, leading to a device management solution that provides scalability across different clusters according to selected criteria for assigning devices to clusters (e.g., different regions, different device types, different user types) using a combination of hardware in different clusters and algorithms for managing data and devices based on instructions executed both by one or more master databases or servers and by that separate hardware.

Figure 4:
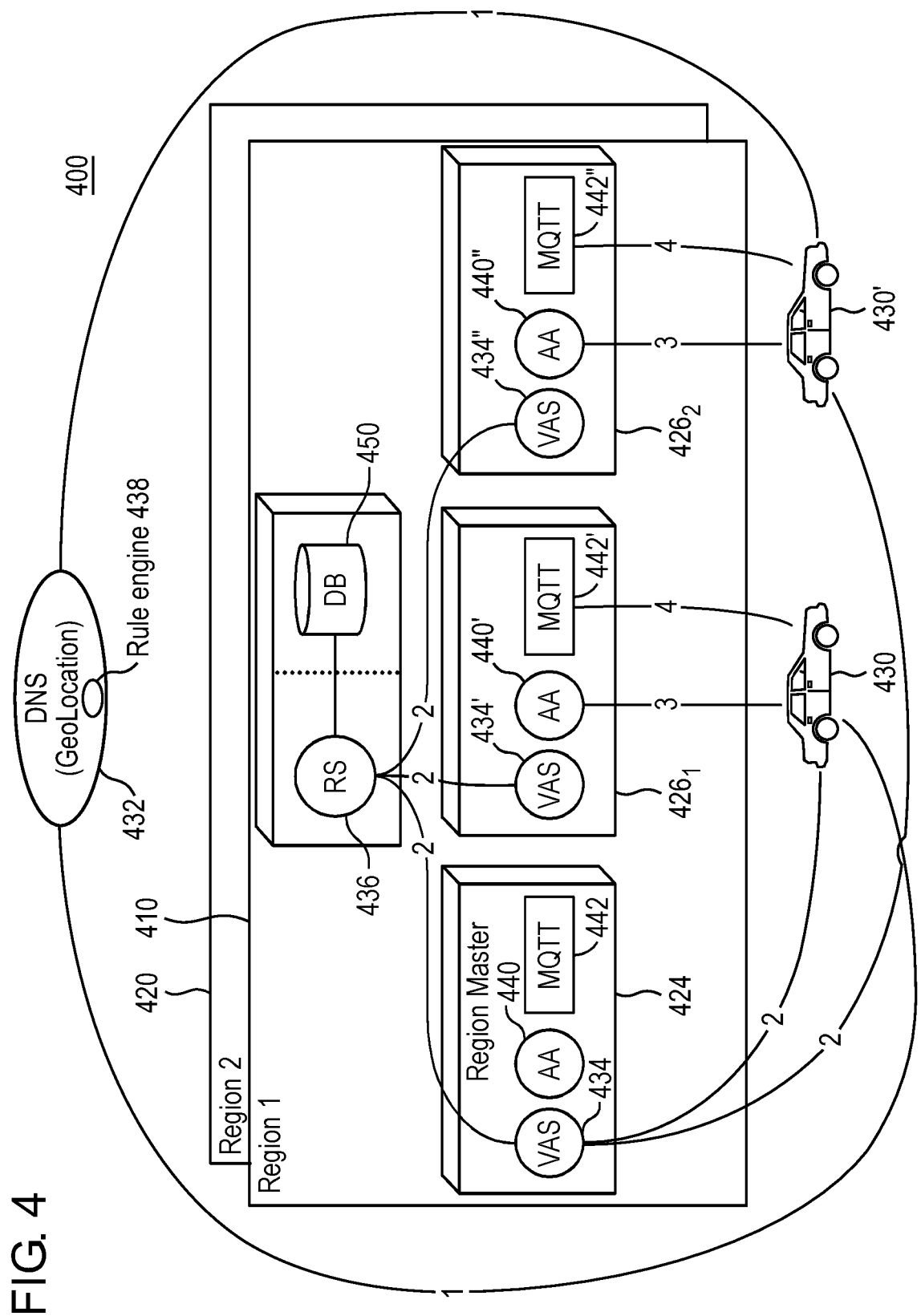
FIG. 4 illustrates an exemplary system for optimizing device management architecture for IoT devices according to an embodiment described herein.

This scalability based on assignment to separate clusters may also be optimized by providing a method by which devices can discover which cluster or master server they belong to. Alternatively or additionally, the region master node endpoint may be configured in the device. This is illustrated by FIG. 4 and described in detail in the description accompanying FIG. 4. The server in the global master node 104 may then guide the devices further where exactly they belong, for example, a node which may be a regional cluster including a regional master node and one or more capsules or regional domain nodes attached to the regional master node. The server may include a database which may be local or remote.

The master node 104 may assign the device 102 to a node using a logical rule including a dimension of the business, for example, the server in the master node 104 may assign vehicles to a regional master node and/or a regional domain node/capsule based on make of the vehicle, model of the vehicle and year of manufacture. The services provided to the vehicle may be dependent on these attributes, and thus vehicles belonging to the same domain node/capsule may receive similar services. Similar logical rules may be applied to the devices other than vehicles and may include other criteria including make, model, date of manufacture, batch number etc.

The domain nodes or capsules $126_1$, $126_2$, $126_3$ ... $126_x$ as illustrated in FIG. 1, may be geographically based as discussed above or may be designed based on some other criteria, for example, make of the device, model of the device, year of manufacture of the device, features available to the device, total number of devices allowed per node etc., and may be a fully contained environment containing data for that device 102 or similar devices whose number may be limited or predetermined per capsule/domain node by design.

The device management architecture system 100 designed according to the embodiment shown in FIG. 1 may provide a system for global device management using the same device management solution around the world, but with different regions or clusters based on a specific criterion being autonomous in terms of data. For example, data gathered from the devices belonging to one cluster or a domain node/capsule within a cluster, may be separated from data gathered from the devices belonging to another cluster or a domain node/capsule by using a differentiating database structure. For example, data gathered from the vehicles within the U.S. may be separated from the data gathered by the vehicles within China, based on the assignment of vehicles to different nodes by using a differentiating database structure. That way the data gathered from a device in one region, e.g., subscriber or driver information, may not be visible in another region even when that device is transferred to another region due to privacy concerns among other things.

For example, as discussed earlier, a connected vehicle program could be structured so that user information that is generated for vehicles based in a jurisdiction with strict data privacy rules (e.g., Europe, China or Russia) may not leave the cluster for the country to which that vehicle is assigned, e.g., a regional cluster or a cluster based on some other criteria. So if a car that is first sold and used in China is then resold and used in Europe, or the owner relocates, the assignment for the vehicle may be changed to the cluster for Europe. After this reassignment, data collected from that vehicle will be stored in the European cluster, but that cluster will not be permitted to share it nor will the cluster in China be permitted to receive or store it. Similarly, data gathered from that vehicle in China, which is stored in the cluster for China, may not be permitted to be shared or transferred to the cluster for Europe.

During its lifecycle, device 102 may change hands, e.g., a vehicle may be sold from manufacturer to a first buyer or from first buyer to a second buyer, or it may move from one geographical region to another. As device 102 undergoes such transitions, it may still require global as well as regional management of devices and applications deployed on it for proper operation of applications as well as for collection of data generated during the operation of the device 102. Upon first registration in a new region, the rules engine 128 may provide logical rules to switch the device assignment from one database node to another database node, e.g., from regional cluster US 106 to regional cluster China 108 or within regional cluster U.S. 106, from capsule 1 126 to capsule x $126_x$ etc. based on changes in the device information to keep the device 102 connected to a node. This switching of device assignment from one node or capsule to another may be performed in a multitude of ways, depending on the needs of the stakeholders (e.g., for access to complete device history, or for compliance with regional rules for data localization). For example, a device could receive a simple update instructing it to send all further device data to the newly-assigned node without moving historical data from the originally assigned database; alternatively, the device and its entire data history could migrate to the new database. The logical rules may define when the device is switched from one node to another and when the device is migrated from one node to another. For example, when the device moves from one node to another within the U.S., it may be assigned to that node via migrate, where the device data is also moved to the new node along with the device. Whereas, when the device moves from a node in China (from a node belonging to one regional cluster) to a node in the U.S. (to a node belonging to another regional cluster) the device data may not be moved to the new node, and only the device is assigned to the new node.

The device 102 may be automatically configured in response to the rules to connect to the assigned database node. This automatic configuration of the device 102 to connect to a different node may be accomplished via hardware update or via software update which may be pushed to the device 102 through the master database management system.

In so doing, the data gathered from the device 102 during its operation before the transition may be separated from data gathered from the device 102 after the transition by using a differentiating database structure. Since the device is assigned to a node or a capsule, all the data gathered and processing of that data is local to that node or capsule, providing separation of data that conforms to regional privacy policies. That way the data gathered from a device in one region e.g. subscriber or driver information, may not be visible in another region even when that device is transferred to another region due to privacy concerns among other things as explained earlier.

Figure 2:
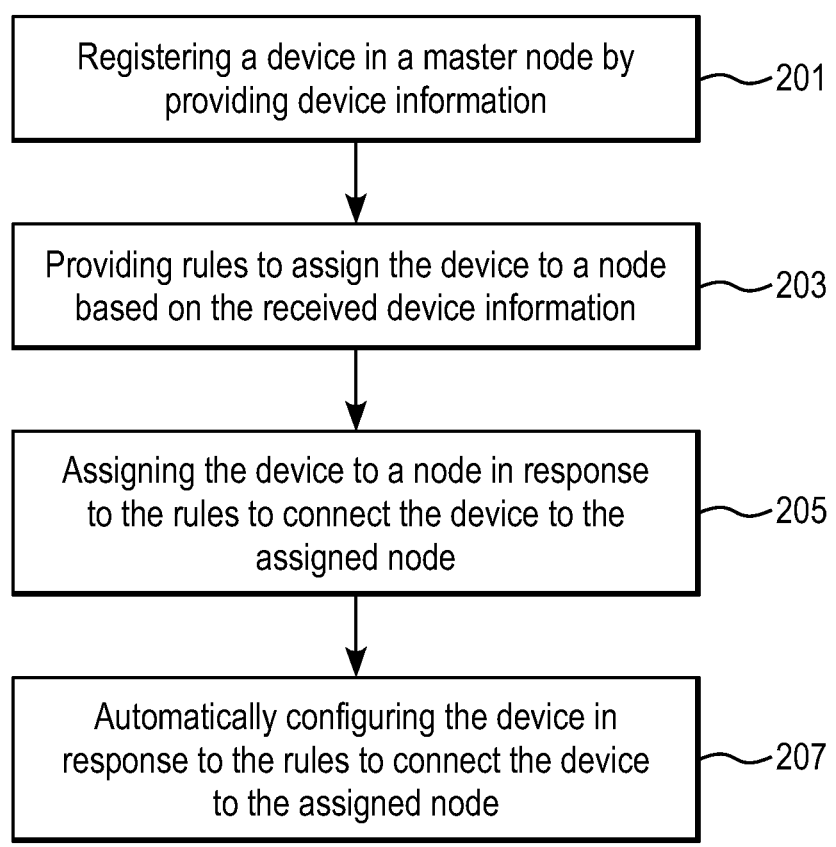
FIG. 2 illustrates a process for optimizing architecture for IoT devices according to an embodiment described herein.

FIG. 2 illustrates a process for optimizing database architecture for IoT devices according to an embodiment described herein. As illustrated in FIG. 2, once a device is manufactured, device information for the device is provided to a server in the master node to register the device with the master node via step 201. The server may include a database which may be local or remote. The server in the master node then directs the device to a regional cluster, via step 205, using logical rules provided by the rules engine 128 by assigning the device to a node based on the device information via step 203.

During the lifecycle of the device, as discussed in the description accompanying FIG. 1, it may change hands, e.g., a vehicle may be sold from manufacturer to a first buyer or from first buyer to a second buyer, or it may move from one geographical region to another. As device undergoes such transitions, it may still require global as well as regional management of devices and applications deployed on those devices for proper operation of applications as well as for collection of data generated during the operation of the device.

A rules engine may provide logical rules to switch the device assignment from one node to another node based on changes in the device information to keep the device connected to a node or capsule resulting in automatically configuring the device in response to the rules to connect the device to the assigned node via step 207. This switching of device assignment from one regional cluster and/or domain node/capsule to another may be performed in a multitude of ways, depending on the needs of the stakeholders (e.g., for access to complete device history, or for compliance with regional rules for data localization). For example, a device could receive a simple update instructing it to send all further device data to the newly-assigned node without moving historical data from the originally assigned database; alternatively, the device and its entire data history could migrate to the new database. The rules may define when the device is switched from one regional cluster and/or domain node to another and when the device is migrated from one node to another. For example, when the device moves from one node to another within the U.S., it may be assigned to that node via migrate, where the device data is also moved to the new node along with the device. Whereas, when the device moves from a node in China (from a node belonging to one regional cluster) to a node in the U.S. (to a node belonging to another regional cluster) the device data may not be moved to the new node, and only the device is assigned to the new node. In addition, the device may be reconfigured so that device data is sent over cellular or wireless channels to a new cloud host for devices assigned to that node. This reconfiguration may be carried out using rules, e.g., a rule may be used to carry out transfer or relocation of device from Capsule A to Capsule B. An alternate rule may be used to transfer or relocate the device from Capsule A to Capsule B which may additionally include migrating all existing data from Capsule A to Capsule B. Capsules A and B may be in the same region or in the different regions. The actual migration of data may take place within the platform without requiring any specific support from the device for which the data is migrated. This migration of data may be important in certain cases, e.g., if a user purchases another vehicle and data gathered from both vehicles needs to be in same capsule for seamless working of certain applications or for improving efficiency of certain applications.

Thus, this automatic configuration/reconfiguration of the device may be accomplished via hardware update or via software update which may be pushed to the device through the master server management system.

In so doing, the data gathered from the device 102 during its operation before the transition may be separated from data gathered from the device 102 after the transition by using a differentiating database structure. Since the device is assigned to a node or a capsule, all the data gathered and processing of that data is local to that node or capsule, providing separation of data that conforms to regional privacy policies. That way the data gathered from a device in one region e.g. subscriber or driver information, may not be visible in another region even when that device is transferred to another region due to privacy concerns among other things as explained earlier.

Figure 5A:
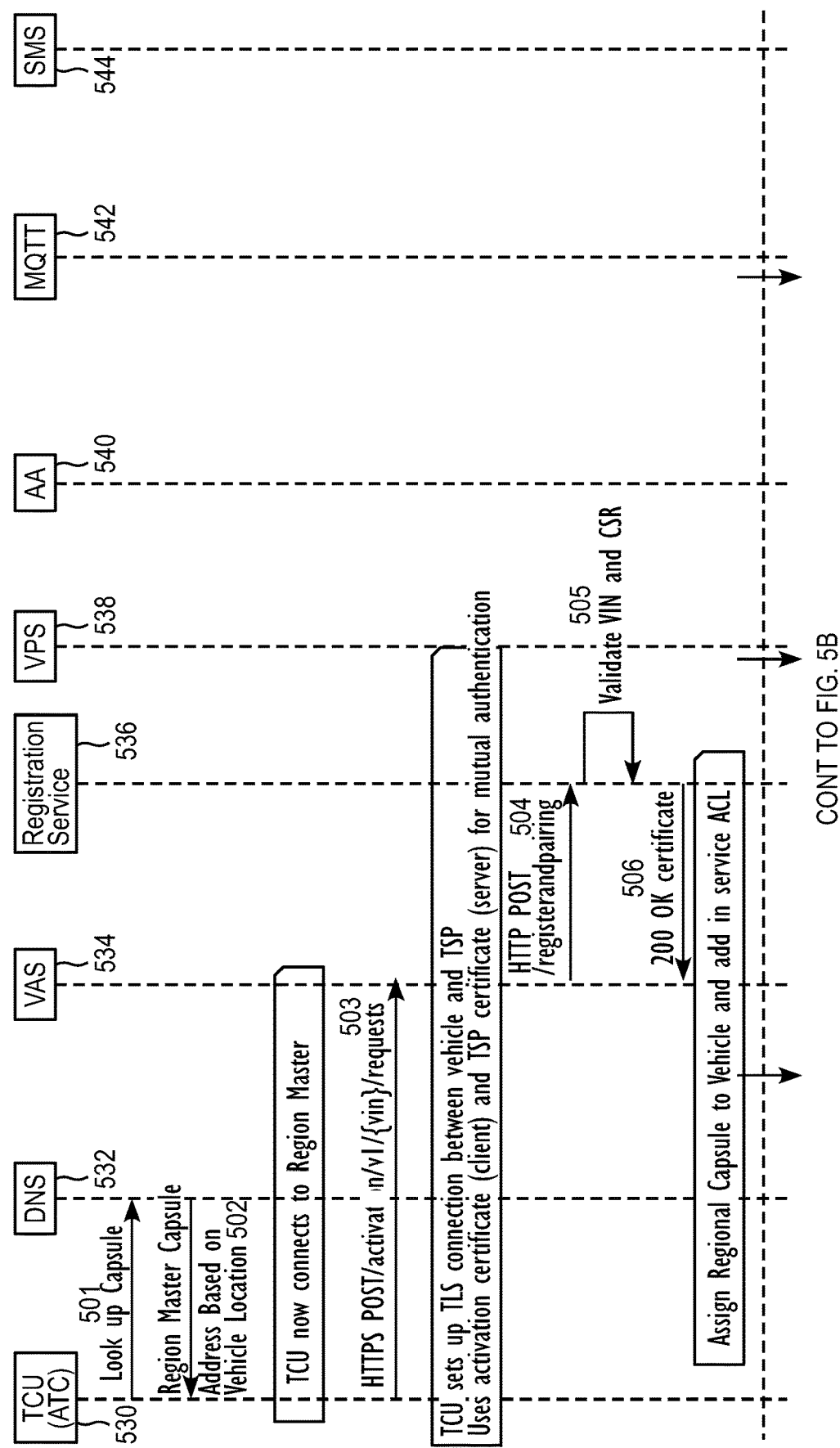
Figure 5B:
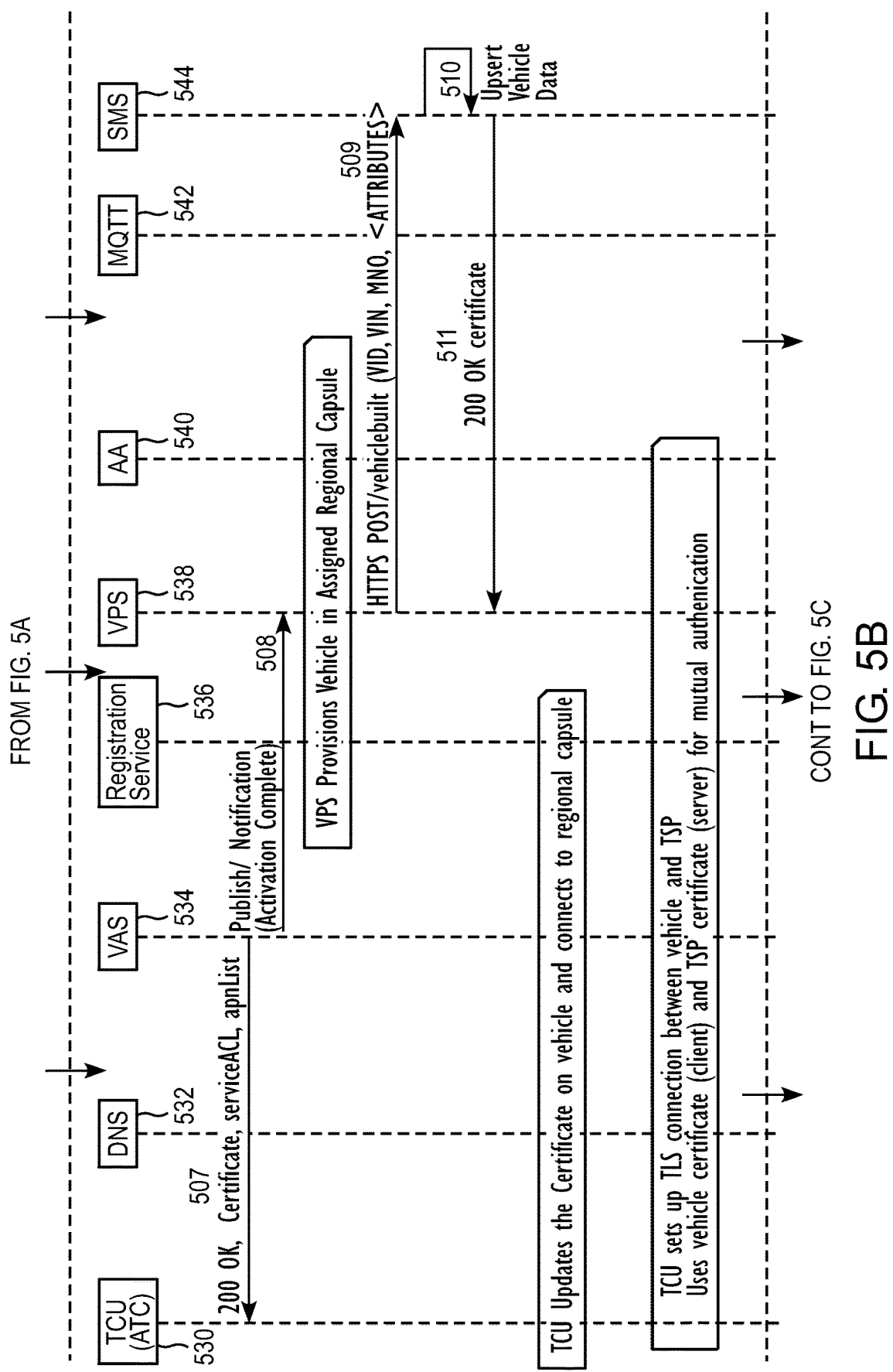

The steps 201, 203, 205 and 207 involved in connecting the device to assigned node illustrated in FIG. 2 are explained in detail in description accompanying FIGS. 5A, 5B and 5C and illustrated in FIGS. 5A, 5B and 5C.

Figure 3A:
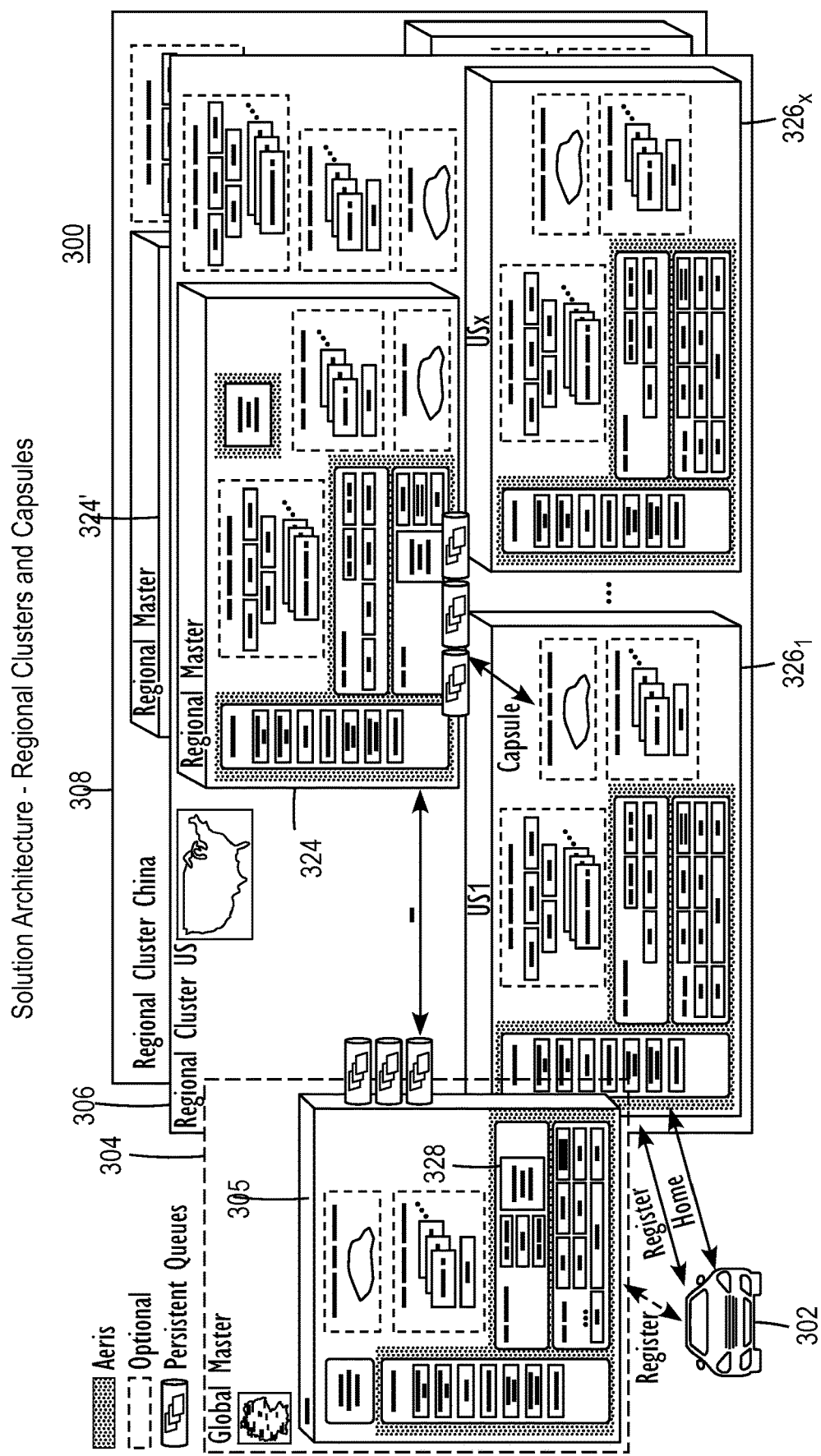

FIGS. 3A-3D illustrate an exemplary system and method for optimizing device management architecture for IoT devices according to an embodiment described herein. FIG. 3A provides an overview of an exemplary system and method for optimizing device management architecture for IoT devices according to an embodiment described herein. As illustrated in FIG. 3A, once device 302 is manufactured, it may require global as well as regional management for proper operation of applications running on it. For example, the ability to connect vehicles to networks for purposes of collecting and analyzing data and managing certain vehicle parameters is becoming essential for manufacturers. These manufacturers and any telematics service providers need flexibility to adapt to different network environments, business rules and processes. Device information for device 302 is provided to a server belonging to a master node, also known as master capsule, 304 to register the device with the master node 304. The server may include a database which may be local or remote.

In an embodiment, the IoT devices or M2M devices may include mobile devices, e.g., vehicles and/or stationary devices, e.g., devices/appliances used in homes, e.g., refrigerators, manufacturing, other industries, e.g., squadrons of drones, medical devices, etc.

The master node 304 is provided with a rule engine 328 that provides rules to assign the device to a node based on the received device information. The master node 304 then assigns the device 302 to a regional cluster or a node/capsule within a regional cluster in response to the rules. The server belonging to the master node 304 thus directs the device 302 to connect to the assigned node, for example, a regional cluster, e.g. 306, 308, based on the device information.

In an embodiment, the logical rules may include simple rules, e.g., in case of vehicles, odd vehicle identification number (VIN) vehicles may be assigned to one node and even VIN vehicles may be assigned to another node. The logical rules used for assignment of a device to particular node may be stored in a rule engine or outside the rule engine in a database or in a file system which may be separate from the database.

Alternatively or additionally, the device information for device 302 may be provided to a server in a regional master node 326 to register the device with the regional master node 326. Since the regional master node comprises components similar to that of the global master node 304, a process similar to the one described above for global master node 304 may be carried out by the regional master node 326.

Each regional cluster, e.g., 306, 308 may include a regional master node, e.g., 324, 324' and domain nodes or capsules, e.g., 3261' . . . 326$_x$' connected to the regional master node, e.g., 324'. The infrastructure used can be optimized through sharding of data at the capsule level based on any number of dimensions or criteria, including but not limited to vehicle make, model, year, location of the vehicle etc. This sharding can be accomplished through rules without any participation or awareness by the client application. This database structure, including any sharding, may be uniform across the device class being managed and may be replicated multiple times by containerizing a region called as regional clusters 306 and 308.

As discussed earlier, traditionally, for systems involving large amounts of data, the systems are designed to scale logically, both with respect to computing capacity and database capacity, in the same physical infrastructure by adding more nodes, leading to purely hardware-based scalability. However, pure hardware-based scalability may have some limitations, including hardware capacity, concentration of risk in a single location, and latency for communications across long distances. In addition, where groups of devices are subject to different rules, requiring the single location to execute different rules for different devices can lead to computing inefficiencies and errors. These limitations may be overcome by creating a full replication of the system outside of the original server, leading to a device management solution that provides scalability across different clusters according to selected criteria for assigning devices to clusters (e.g., different regions, different device types, different user types) using a combination of hardware in different clusters and algorithms for managing data and devices based on instructions executed both by one or more master databases or servers and by that separate hardware. This scalability based on assignment to separate clusters may also be optimized by providing a method by which devices can discover which cluster or master server they belong to.

In an embodiment, the server in the master node surveys the devices during a registration process for that device to determine, for example, which cluster and/or a domain node/capsule within a cluster a device belongs to, e.g., capsule 1. These clusters and/or domain nodes or capsules within a cluster may be geographically based or may be designed based on some other criteria, for example, type of device, user information etc. These domain nodes or capsules may be a fully contained environment containing data only for that device and similar devices assigned to that node or capsule using the same criteria, and whose number may be limited or predetermined per capsule by design. This is illustrated by FIG. 4 and described in detail in the description accompanying FIG. 4. The server in the master node or master capsule may then guide the devices further where exactly they belong, for example, a node which may be a regional cluster including a regional master node and a domain node or capsule; or a domain node or capsule attached to the regional master node.

The master node or master capsule may assign the device 302 to a node using a logical rule including a dimension of the business, for example the master node also known as master capsule may assign vehicles based on make of the vehicle, model of the vehicle, year of manufacture. Similar logical rules may be applied to the devices other than vehicles and may depend on any of make of the device, model of the device, date of manufacture of the device, batch number for the device, geographical location of the device, or a combination thereof. Criteria other than the ones listed here may also be used.

These nodes or capsules $326_1 \ldots 326_x$ may be geographically based or may be designed based on some other criteria, for example, type of device, user information etc. and may be a fully contained environment containing data for that device 302 or similar devices whose number may be limited or predetermined per domain node or capsule by design. The device management architecture system 300 designed this way provides a global device management architecture, e.g., same device management solution around the world, with different regions being autonomous in terms of data or other business rules (e.g., serving different features available in different regions). The data gathered from the devices belonging to one node may be separated from data gathered from the devices belonging to another node by using a differentiating database structure. For example, data gathered from the vehicles within the U.S. (one cluster based on a specific criteria, e.g., in this case geographical location) may be separated from the data gathered by the vehicles within China (another cluster based on the same specific criteria), based on the assignment of vehicles to different nodes by using a differentiating database structure. That way the data gathered from a device in one region, e.g., subscriber or driver information, may not be visible in another region even when that device is transferred to another region due to privacy concerns among other things. Similarly, a domain node/capsule within a cluster can more efficiently manage devices with similar feature sets.

As discussed earlier, during its lifecycle, the device 302 may change hands multiple times, e.g., a vehicle may be sold from the manufacturer to a first buyer or from the first buyer to a second buyer etc., or it may move from one geographical region to another. As the device 302 undergoes such transitions, it may still require global as well as regional management of devices and applications deployed on those devices for proper operation of applications as well as for collection of data generated during the operation of the device 302. Upon first registration in a new region, the rules engine 328 may provide rules also known as logical rules to switch the device assignment from one node to another node, e.g., from regional cluster US 306 to regional cluster China 308 or within regional cluster U.S. 306, from domain node/capsule 1 $326_1$ to domain node/capsule x $326_x$ etc. based on changes in the device information to keep the device 302 connected to a node. This switching of device assignment from one node/capsule, or a node/capsule from one cluster to another may be performed in a multitude of ways, depending on the needs of the stakeholders (e.g., for access to complete device history, or for compliance with regional rules for data localization). For example, a device could receive a simple update instructing it to send all further device data to the newly-assigned node without moving historical data from the originally assigned database; alternatively, the device and its entire data history could migrate to the new database.

The rules or the logical rules may define when the device 302 is switched from one node to another by a simple update where the device data does not move to the new node and when the device 302 is migrated from one node to another where the device data moves to the new node along with the device 302. For example, when the device 302 moves from one node to another within the U.S., it may be assigned to that node via migrate, where the device data is also moved to the new node along with the device 302. Whereas, when the device 302 moves from a node in China (from a node belonging to one regional cluster) to a node in the U.S. (to a node belonging to another regional cluster) the device data may not be moved to the new node, and only the device 302 is assigned to the new node. In addition, the device may be reconfigured so that device data is sent over cellular or wireless channels to a new cloud host for devices assigned to that node. This reconfiguration may be carried out using rules, e.g., a rule may be used to carry out transfer or relocation of device from Capsule A to Capsule B. An alternate rule may be used to transfer or relocate the device from Capsule A to Capsule B which may additionally include migrating all existing data from Capsule A to Capsule B. Capsules A and B may be in the same region or in the different regions. The actual migration of data may take place within the platform without requiring any specific support from the device for which the data is migrated. This migration of data may be important in certain cases, e.g., if a user purchases another vehicle and data gathered from both vehicles needs to be in same capsule for seamless working of certain applications or for improving efficiency of certain applications.

The device 302 may be automatically configured in response to the rules to connect to the assigned database node. This automatic configuration of the device 302 to connect to a different node may be accomplished via hardware update or via software update which may be pushed to the device 302 through the master database management system.

In so doing, the data gathered from the device 302 during its operation before the transition may be separated from data gathered from the device 302 after the transition by using a differentiating database structure. Since the device is assigned to a node or a capsule, if business rules so require or if otherwise desired, all the data gathered and processing of that data can be local to that node or capsule, providing separation of data that conforms to regional privacy policies. That way the data from one region e.g., subscriber or driver information is not visible in another region due to privacy concerns among other things.

Figure 3B:
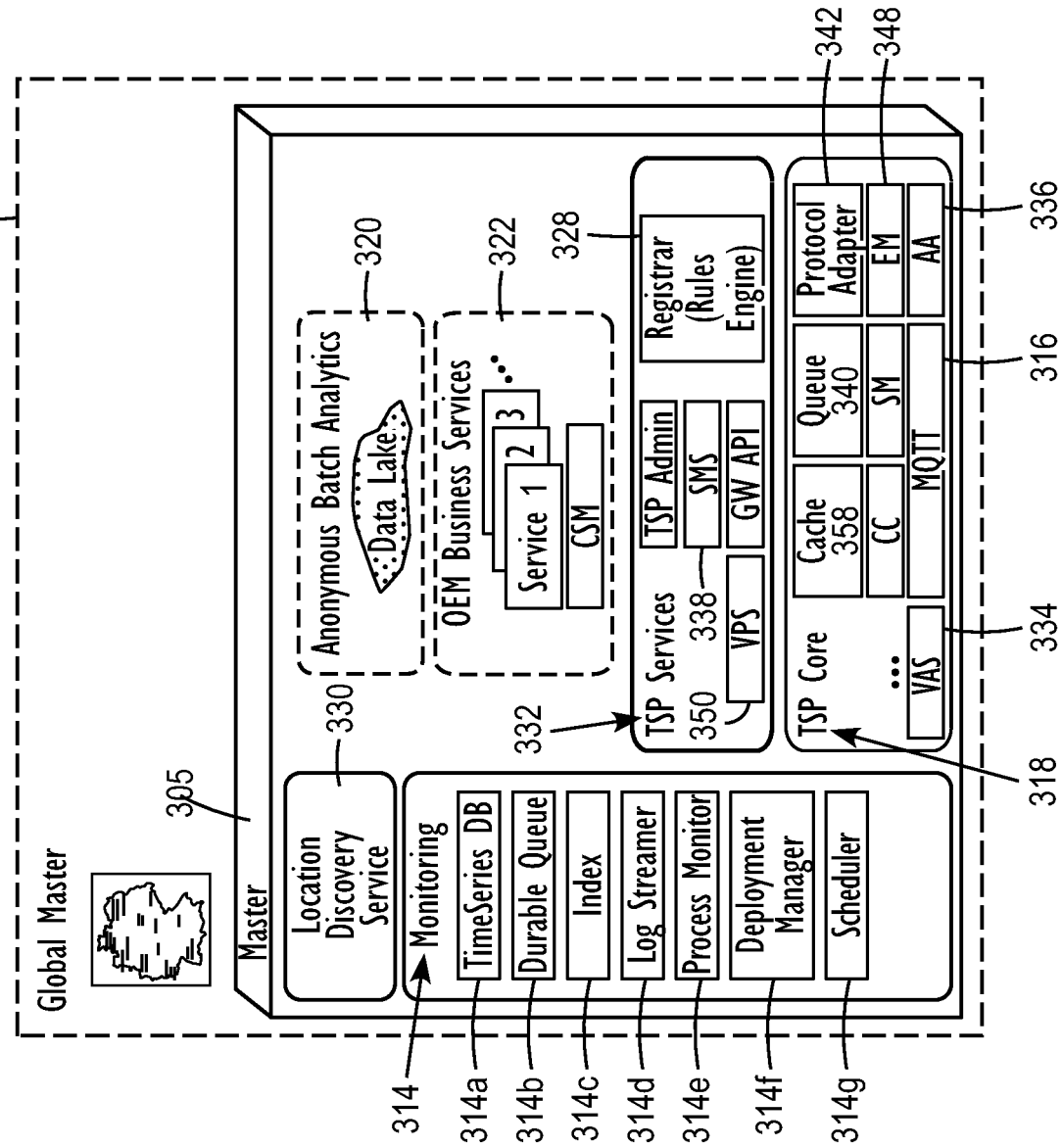
Figure 3C:
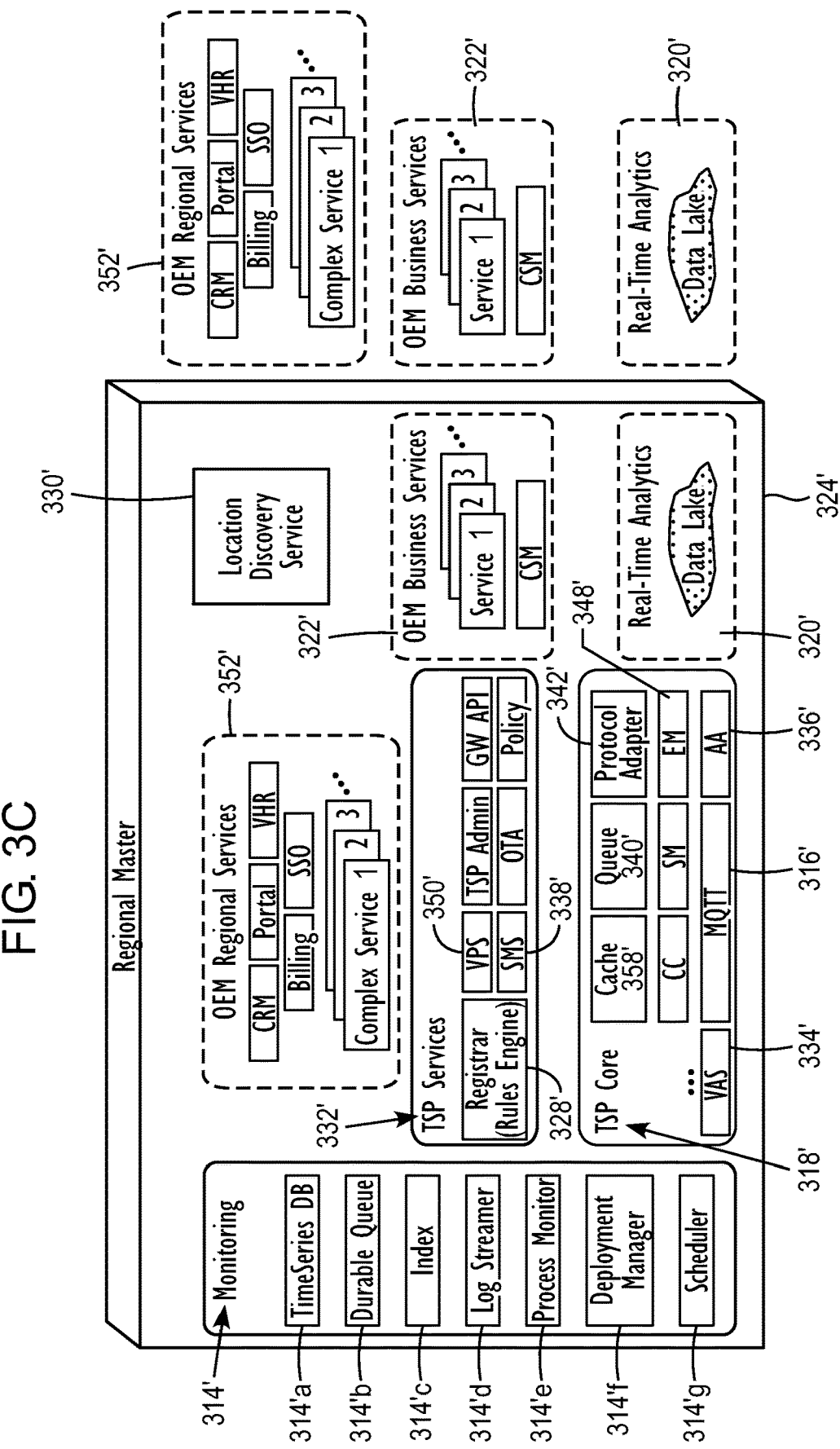

FIGS. 3B-3D provide detailed illustration of various components shown in FIG. 3A. For example, FIG. 3B provides a detailed illustration of a global master node 304 and/or master node 306 shown in FIG. 3A. The global master node 304 and/or master node 306 is provided with different components to carry out the processes involved in connecting the device to assigned node illustrated in FIGS. 1, 5A, 5B and 5C and described in detail in description accompanying FIGS. 1, 5A, 5B and 5C. For example, the global master node 304 and/or master node 306 includes a domain name server (DNS) or a location discovery service 330; telematics service provider (TSP) core 318; telematics service provider (TSP) service 332; monitoring service 314; TSP core 318; anonymous batch analytics 320 and OEM business services 322. The OEM business services 322 and anonymous batch analytics 320 may be optional. In an embodiment, the OEM business services 322 and anonymous batch analytics 320 may reside within the master node 304 and/or 306, or may be external to the master node 304 and/or 306.

The telematics service provider (TSP) core 318 may further include an authentication and authorization server (AA), message queuing telemetry transport (MQTT) 316 and vehicle activation service (VAS) 334.

The telematics service provider (TSP) service 332 may further include subscription management service (SMS) 338 which may also be known as a transaction service provided for managing subscriptions based on transactions to the OEM and registrar/rules engine 328 also known as registration service module. The registrar 328 is provided with a rule engine, which may be within the registration service module or external to the registration service module. VAS, the vehicle activation service, 334 is responsible for completing the registration process with registrar 328 and assigning appropriate regional node to the vehicles.

The monitoring service 314 may further include Time-Series DB 314a, e.g., InfluxDB, Cassandra, MongoDB; Durable Queue 314b, e.g., Kafka, ActiveMQ, RabbitMQ; Index 314c, e.g., ElasticSearch, Solr; Log Streamer 314d, e.g., Logstash, Flume; Process Monitor 314e, e.g., Nagios, Munin; Deployment Manager 314f, e.g., Rancher; Orchestration Scheduler 314g, e.g., Cattle, Kubernetes.

The TSP core 318 may further include Cache 358, e.g., Redis or Hazelcast; Queue 340, e.g., Kafka, ActiveMQ, RabbitMQ.

Although exemplary products that may be used are listed here, a person skilled in the art readily understands that other products serving the same or similar functionality may be used. The global master node 304 and/or the master node 306 may also include, vehicle provisioning system (VPS), SMS 338 holds vehicle master data in the regional capsule, and VPS is responsible for provisioning the vehicle in the regional capsule SMS 338.

FIG. 3C provides a detailed illustration of a regional master node 324 shown in FIG. 3A. The regional master node 324 is provided with different components to carry out the processes involved in connecting the device to assigned node within the regional master where applicable as illustrated in FIGS. 1, 5A, 5B and 5C and described in detail in description accompanying FIGS. 1, 5A, 5B and 5C. For example, the regional master node 324 includes a domain name server (DNS) or a location discovery service 330'; telematics service provider (TSP) core 318'; telematics service provider (TSP) service 332'; monitoring service 314'; TSP core 318'; anonymous batch analytics 320' and OEM business services 322'. The OEM business services 322' and anonymous batch analytics 320' may be optional. In an embodiment, the OEM business services 322' and anonymous batch analytics 320' may reside within the regional master node 324 or may be external to the regional master node 324.

The telematics service provider (TSP) core 318' may further include an authentication and authorization server (AA) 336', message queuing telemetry transport (MQTT) 316' and vehicle activation service (VAS) 334'.

The telematics service provider (TSP) service 332' may further include subscription management service (SMS) 338' which may also be known as a transaction service provided for managing subscriptions based on transactions to the OEM and registrar/rules engine 328' also known as registration service module. The registrar 328' is provided with a rule engine, which may be within the registration service module or external to the registration service module. VAS, the vehicle activation service, 334' is responsible for completing the registration process with registrar 328' and assigning appropriate regional node to the vehicles.

The monitoring service 314' may further include Time-Series DB 314a', e.g., InfluxDB, Cassandra, MongoDB; Durable Queue 314b', e.g., Kafka, ActiveMQ, RabbitMQ; Index 314c', e.g., ElasticSearch, Solr; Log Streamer 314d', e.g., Logstash, Flume; Process Monitor 314e', e.g., Nagios, Munin; Deployment Manager 314f', e.g., Rancher; Orchestration Scheduler 314g', e.g., Cattle, Kubernetes.

The TSP core 318' may further include Cache 358', e.g., Redis or Hazelcast; Queue 340', e.g., Kafka, ActiveMQ, RabbitMQ.

Although exemplary products that may be used are listed here, a person skilled in the art readily understands that other products serving the same or similar functionality may be used. The regional master node 324 may also include, vehicle provisioning system (VPS) 350', SMS 338' holds vehicle master data in the regional capsule, and VPS 350' is responsible for provisioning the vehicle in the regional capsule SMS 338'.

FIG. 3D provides a detailed illustration of an exemplary regional node/capsule 326 shown in FIG. 3A. The regional node/capsule 326 is provided with different components to carry out the processes involved in connecting the device to it and collecting and storing the collected data for the device. For example, the data collected for the devices is stored in capsule leaf node in a tree and all the devices connect and dispatch the data to the capsule. The different components of each capsule and their functioning is further illustrated in FIGS. 1, 5A, 5B and 5C and described in detail in description accompanying FIGS. 1, 5A, 5B and 5C. For example, the regional node/capsule 326 may include a telematics service provider (TSP) core 318"; telematics service provider (TSP) service 332"; monitoring service 314"; TSP core 318"; anonymous batch analytics 320"; OEM business services 322" and OEM regional services 352", e.g., billing, user credentials, privacy features, services specific to a particular geographic region, etc. The OEM regional services 352", OEM business services 322" and anonymous batch analytics 320" may be optional. In an embodiment, the OEM regional services 352", OEM business services 322" and anonymous batch analytics 320" may reside within the regional node/capsule 326 or may be external to the regional node/capsule 326.

The detailed description of telematics service provider (TSP) core 318"; telematics service provider (TSP) service 332"; monitoring service 314"; TSP core 318"; anonymous batch analytics 320"; OEM business services 322" is provided above in the description accompanying FIGS. 3B and 3C.

FIG. 4 illustrates an exemplary system for optimizing device management architecture for IoT devices according to an embodiment described herein. The system for optimizing device management architecture for IoT devices may include a regional master node, also known as regional master capsule, having a vehicle activation service (VAS) 434, Authentication and authorization server (AA) 440 and Message Queuing Telemetry Transport (MQTT) 442. The regional master node may comprise a single server or a cluster of one or more servers which may be at a single location or distributed over different locations.

In an embodiment, the registration service (RS) 436 also known as a registration service module may be hosted by original equipment manufacturer (OEM). The RS 436 may be responsible for identifying vehicles 430 and 430' during registration process and issuing new credentials, for example, certificates. Additionally or alternatively, the RS 436 may be provided with rules to assign vehicles to regional domain nodes. Vehicles 430 and 430' are pre-provisioned in a provisioning database (DB) 450 during manufacturing process. The system further includes a domain name server (DNS) 432. The DNS 432 is based on GeoLocation and is responsible for resolving master regional node assignment based on GeoLocation. The DNS service 432 could also resolve the domain name of the node to actual IP address to which the device would connect based on preconfigured rules to redirect vehicle to desired regional master node. The DNS 432 may be provided with a rules engine 438 that provides rules to direct/redirect vehicle to desired regional master node. VAS, the vehicle activation service 434, is responsible for completing the registration process with RS 436 and assigning the appropriate regional node to the vehicles 430 and 430' based on recommendation received from RS 436. AA, the authentication and authorization server 440, is responsible for authenticating vehicles 430 and 430', and issuing tokens to connect to MQTT 442, and MQTT 442 provides pub/sub infrastructure for vehicles 430 and 430' to be authenticated with MQTT 442 and to allow exchange of data with platform and mobile devices.

As shown in FIG. 4, the vehicles 430 and 430' look up DNS 432 to resolve regional master node assignment via step 1. The DNS service 432 could also resolve the domain name of the node to actual IP address to which the device would connect based on preconfigured rules to redirect vehicle to desired regional master node. The vehicles 430 and 430' then connect to VAS 434 in regional master node 424 to obtain credentials and also obtain the regional domain node/capsule address to connect to via step 2. The vehicles 430 and 430' are then authenticated against AA 440' and 440" respectively in assigned regional domain nodes/capsules 4261 and 4262 via step 3. The vehicles 430 and 430' then use tokens from AA 440' and 440" respectively to connect to MQTT 442' and 442" via step 4.

Steps 1-4 described above are illustrated in FIGS. 5A-5C and described in detail in description accompanying FIGS. 5A-5C.

FIGS. 5A, 5B and 5C illustrate a process for optimizing device management architecture for IoT devices according to an embodiment described herein. The system used for the process for optimizing device management architecture for IoT devices described herein includes TCU, a telematics client, for example, automotive telematics client (ATC) 530, a domain name server (DNS) 532, vehicle activation service (VAS) 534, registration service (RS) 536 also known as a registration service module, vehicle provisioning system (VPS) 538, an authentication and authorization server (AA) 540, message queuing telemetry transport (MQTT) 542 and subscription management service (SMS) 544 which may also be known as a transaction service provided for managing subscriptions based on transactions to the OEM. The TCU 530 may include vehicle services including registration service in the vehicle. SMS 544 holds vehicle master data in the regional node or regional capsule, and VPS 538 is responsible for provisioning the vehicle in the regional node or regional capsule SMS 544.

As described above in the description accompanying FIG. 4, the DNS 532 is based on GeoLocation and is responsible for resolving master regional node assignment based on GeoLocation. The DNS service could also resolve the domain name of the node to actual IP address to which the device would connect based on preconfigured rules to redirect vehicle to desired regional master node also known as regional master capsule. The DNS 532 may be provided with rules to direct/redirect vehicle to desired regional master node. VAS, the vehicle activation service, 534 is responsible for completing the registration process with RS 536 and assigning appropriate regional node to the vehicles. AA, the authentication and authorization server 540, is responsible for authenticating vehicles, and issuing tokens to connect to MQTT 542, and MQTT 542 provides pub/sub infrastructure for vehicles to be authenticated with MQTT 542 and to allow exchange of data with platform and mobile devices.

As shown in FIG. 5A, vehicle TCU 530 looks up DNS 532 to resolve regional master node assignment via step 501. The DNS 532 provides regional master node address to the TCU 530 based on vehicle location via step 502. TCU 530 now connects to the regional master node based on the address provided by the DNS 532. TCU 530 then posts activation requests to VAS 534 by providing VIN for the vehicle for which the services have to be activated via step 503. This is done by vehicle TCU which sets up TLS connection between the vehicle and telematics service provider (TSP) by using a client-side activation certificate and TSP certificate which is a server-side certificate for mutual authentication.

VAS 534 sends registration and pairing request to RS 536 via step 504. RS 536 validates the VIN and a certificate signing request (CSR) via step 505, and after validation, sends OK certificate via step 506 to VAS 534. VAS 534 assigns a regional node to the vehicle and adds in service endpoints, e.g., InitialServiceList and/or serviceACL (access control list) for that vehicle. VAS 534 then sends the InitialServiceList and/or serviceACL which provides Service endpoints, e.g., URL of authentication service within a region. Generally, the ServiceList and the ACL go together. The ServiceList defines allowed services while ACL defines restrictions. The service list provides a list of services, their configuration and enforcement rules. The configuration can contain allowances and denials of properties of each specific service. A service may be defined as functionality visible to the user of the device, or a machine to machine functionality and may include any one or more of: 1) authentication service: yes/no, what type, where, etc.; 2) door lock service: yes/no, when, by who, requires license: yes/no, etc.; 3) start engine: yes/no, when, by who, etc.

During activation, the device is assigned a minimal list of Services and Access Control List (ACL) which are sufficient for it to further connect to the initial assigned node, authenticate and then get an extended Service List and ACL from the assigned node. For example, the InitialServiceList can contain the address of the initial node, the protocol to be used, authentication parameters and/or process. The initial ACL may contain firewall rules to allow communication to flow. Once the device connects to the assigned node and authenticates, it gets a full ServiceList and full ACL based on the subscription of the vehicle. For example, if this vehicle is assigned to a plan that enables DoorLock, EngineStart and ECall, then the full-service list will include all those services and enforcement rules for enforcing those services. Allowing the vehicle to discover the services to which it is entitled increases flexibility by avoiding having to hardcode the permitted services in the vehicle software.

Once the vehicle has had a full ServiceList assigned, then VAS 534 sends an access point name (APN) list to TCU 530 via step 507. The VAS 534 also publishes notification to VPS 538 notifying that activation is complete via step 508. VPS 538 then provisions the vehicle in the assigned regional node and posts vehicle attributes to SMS 544 via step 509. SMS 544 upserts (update or insert) vehicle data, for example, adding the vehicle data by either inserting a new row containing the vehicle data in the database or by updating the vehicle data in the existing row in the database, via step 510, and if validated returns OK certificate to VPS 538 via step 511.

TCU 530 updates the certificate on the vehicle and connects to the assigned regional domain node/capsule. TCU 530 sets up TLS connection between the vehicle and the TSP, using vehicle certificate (client-side certificate) and TSP certificate (server-side certificate) for mutual authentication and initiates connection with AA 540 by sending HTTPS token to AA 540 via step 512. AA 540 looks up the vehicle at SMS 544 via step 513, and in response, SMS 544 sends either a 200 (OK) or 404 (not found) response via step 514. If OK, AA 540 provisions credentials to MQTT 538, and sends message to TCU 530 as 200 OK (AT, RT, VID) OR 401 (unauthorized access denied due to invalid credentials) via step 516. TCU 530 may retry after configured interval if AA 540 returns 401, which may occur if there is significant delay in vehicle provisioning. Once OK, the TCU 530 responds to the MQTT 542 with MQTT CONNECT (AT) via step 517, and the MQTT 542 acknowledges connection via step 518. The vehicles are thus connected to the regional domain node/capsule.

Figure 6:
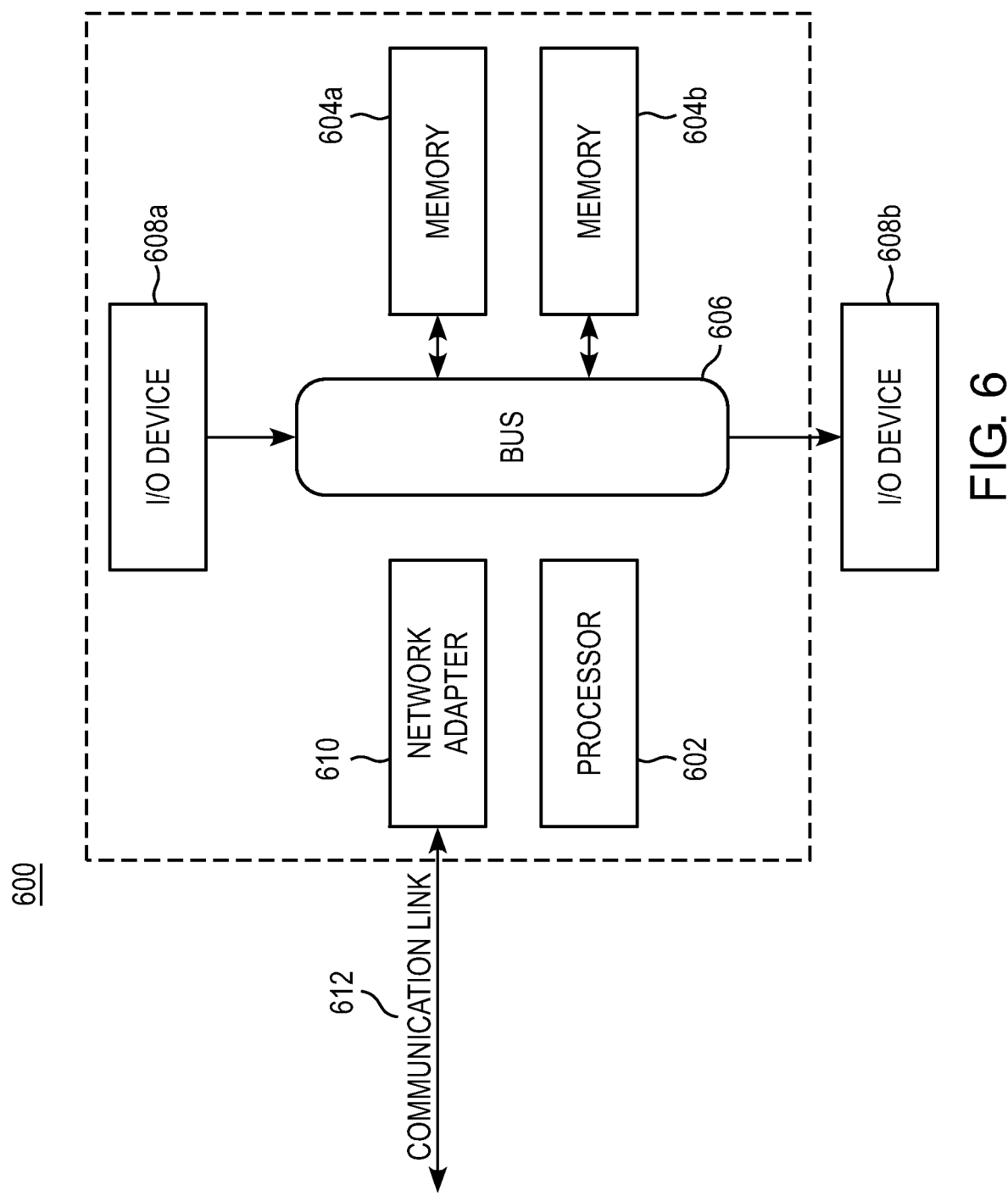
FIG. 6 illustrates a data processing system 600 suitable for storing the computer program product and/or executing program code relating to the optimization of device management architecture for IoT devices in accordance with an embodiment described herein.

FIG. 6 illustrates a data processing system 600 suitable for storing the computer program product and/or executing program code in accordance with an embodiment described herein. The data processing system 600 includes a processor 602 coupled to memory elements 604a-b through a system bus 606. In other embodiments, the data processing system 600 may include more than one processor and each processor may be coupled directly or indirectly to one or more memory elements through a system bus.

Memory elements 604a-b can include local memory employed during actual execution of the program code, bulk storage, and cache memories that provide temporary storage of at least some program code in order to reduce the number of times the code must be retrieved from bulk storage during execution. As shown, input/output or I/O devices 608a-b (including, but not limited to, keyboards, displays, pointing devices, etc.) are coupled to the data processing system 600. I/O devices 608a-b may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments of the process described herein can take the form of a software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc., are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for optimizing device management architecture for IoT devices, wherein the IoT devices include machine to machine (M2M) devices; the method comprising:
   providing device information to a server in a master node for registering a device with the master node, wherein the master node comprises any of: a global master node and a regional master node;
   providing rules to assign the device to at least one node based on the device information, wherein the at least one node comprises any of: a regional cluster and a domain node, and wherein the regional cluster further comprises a regional master node and one or more domain nodes;
   assigning the device to the at least one node in response to the rules; and
   automatically configuring the device to connect the device to the assigned node, wherein each node represents a logical entity comprising one or more servers.

2. The computer-implemented method of claim 1, wherein the device information comprises any of device identification number, location of the device, network access provider, device user name, device subscription and data collected during device usage or a combination thereof.

3. The computer-implemented method of claim 1, wherein providing rules to assign the device to at least one node further comprises providing rules to change the device assignment from the at least one node to another node based on changes in the device information to keep the device connected to a node.

4. The computer-implemented method of claim 1, wherein each node is connected to at least one master node for provisioning the device with one or more services.

5. The computer-implemented method of claim 1, wherein each node is independent from other nodes for storing data related to the device.

6. The computer-implemented method of claim 1, wherein access to services assigned to the node is determined by one or more access rules.

7. The method of claim 1, wherein the M2M devices comprise any of: mobile IoT devices, stationary IoT devices, IoT devices used in manufacturing, and IoT devices used in other industries.

8. The method of claim 1, wherein the IoT devices including M2M devices comprise a vehicle.

9. A system for optimizing device management architecture for IoT devices, wherein the IoT devices include machine to machine (M2M) devices, the system comprising:
   one or more nodes; wherein each one of the one or more nodes comprises at least one server and represents a logical entity;
   a registration service module, wherein the registration service module registers a device in a database server of a master node using device information, wherein the master node comprises any of: a global master node and a regional master node; and
   a rules engine, wherein the rules engine provides rules to assign the device to at least one node from the said one or more nodes based on the received device information, wherein the at least one node comprises any of: a regional cluster and a domain node, and wherein the regional cluster further comprises a regional master node and one or more domain nodes;
   wherein the at least one server assigns the device to the at least one node of the said one or more nodes in response to the rules; and
   the device is automatically configured in response to the assignment to keep the device connected to the assigned at least one node.

10. The system of claim 9, wherein the device information further comprises any of device identification number, location of the device, network access provider, device user name, device subscription and data collected during device usage or a combination thereof.

11. The system of claim 9, wherein assigning the device to at least one node further comprises using rules to change the device assignment from the assigned at least one node to another node based on changes in the device information to keep the device connected to a node.

12. The system of claim 9, wherein each node is connected to the master node for provisioning the device with one or more services.

13. The system of claim 9, wherein each node is independent from other nodes for storing data related to the device.

14. The system of claim 9, wherein access to the at least one node is determined by one or more access rules.

15. The system of claim 9, wherein the M2M devices comprise any of: mobile IoT devices, stationary IoT devices, IoT devices used in manufacturing, and IoT devices used in other industries.

16. The system of claim 9, wherein IoT devices including M2M devices comprise a vehicle.

17. A computer program product stored on a non-transitory computer readable medium for optimizing device management architecture for IoT devices, wherein the IoT devices include machine to machine (M2M) devices; the computer program product comprising:
 a processor, and
 a memory in communication with the processor wherein the memory containing program instructions which when executed by the processor, perform the following operations comprising:
  providing device information to a server in a master node for registering the device with the master node, wherein the master node comprises any of: a global master node and a regional master node;
  providing rules to assign the device to at least one of the one or more nodes based on the device information;
  assigning the device to the at least one of the one or more nodes in response to the rules, wherein the at least one node comprises any of: a regional cluster and a domain node, and wherein the regional cluster further comprises a regional master node and one or more domain nodes; and
  automatically configuring the device to connect the device to the assigned at least one of the one or more nodes, wherein each node represents a logical entity comprising one or more servers.

18. The computer program product of claim 17, wherein the device information further comprises any of device identification number, location of the device, network access provider, device user name, device subscription and data collected during device usage or a combination thereof.

19. The computer program product of claim 17, wherein assigning the device to at least one node further comprises providing rules to change the device assignment from one node to another node based on changes in the device information to keep the device connected to a node.

20. The computer program product of claim 17, wherein each node is connected to the master node for provisioning the device with one or more services.

21. The computer program product of claim 17, wherein each node is independent from other nodes for storing data related to the device.

22. The computer program product of claim 17, wherein access to the at least one node is determined by one or more access rules.

23. The computer program product of claim 17, wherein the M2M devices comprise any of: mobile IoT devices, stationary IoT devices, IoT devices used in manufacturing, and IoT devices used in other industries.

24. The computer program product of claim 17, wherein the IoT devices including M2M devices comprise a vehicle.

25. A computer implemented method for optimizing device management architecture for IoT devices, wherein the IoT devices include machine to machine (M2M) devices; the method comprising:
 providing device information to a server in a master node for registering a device with the master node;
 providing rules to assign the device to at least one node based on the device information, wherein providing rules to assign the device to at least one node further comprises providing rules to change the device assignment from the at least one node to another node based on changes in the device information to keep the device connected to a node;
 assigning the device to the at least one node in response to the rules; and
 automatically configuring the device to connect the device to the assigned node, wherein each node represents a logical entity comprising one or more servers.

26. The computer-implemented method of claim 25, wherein the master node comprises any of: a global master node and a regional master node; and the at least one node comprises any of: a regional cluster and a domain node.

27. The computer-implemented method of claim 26, wherein the regional cluster further comprises a regional master node and one or more domain nodes.

28. The computer-implemented method of claim 25, wherein the device information comprises any of device identification number, location of the device, network access provider, device user name, device subscription and data collected during device usage or a combination thereof.

29. The computer-implemented method of claim 25, wherein each node is connected to at least one master node for provisioning the device with one or more services.

30. The computer-implemented method of claim 25, wherein each node is independent from other nodes for storing data related to the device.

31. The computer-implemented method of claim 25, wherein access to services assigned to the node is determined by one or more access rules.

32. The method of claim 25, wherein the M2M devices comprise any of: mobile IoT devices, stationary IoT devices, IoT devices used in manufacturing, and IoT devices used in other industries.

33. The method of claim 25, wherein IoT devices including M2M devices comprise a vehicle.

34. A system for optimizing device management architecture for IoT devices, wherein the IoT devices include machine to machine (M2M) devices, the system comprising:
 one or more nodes; wherein each one of the one or more nodes comprises at least one server and represents a logical entity;
 a registration service module, wherein the registration service module registers a device in a database server of a master node using device information; and
 a rules engine, wherein the rules engine provides rules to assign the device to at least one node from the said one or more nodes based on the received device information, wherein providing rules to assign the device to at least one node further comprises providing rules to change the device assignment from the at least one node to another node based on changes in the device information to keep the device connected to a node;
 wherein the at least one server assigns the device to the at least one node of the said one or more nodes in response to the rules; and the device is automatically configured in response to the assignment to keep the device connected to the assigned at least one node.

35. The system of claim 34, wherein the master node comprises any of: a global master node and a regional master node; and the at least one node comprises any of: a regional cluster and a domain node.

36. The system of claim 35, wherein the regional cluster further comprises a regional master node and the one or more domain nodes.

37. The system of claim 34, wherein the device information further comprises any of device identification number, location of the device, network access provider, device user name, device subscription and data collected during device usage or a combination thereof.

38. The system of claim 34, wherein each node is connected to the master node for provisioning the device with one or more services.

39. The system of claim 34, wherein each node is independent from other nodes for storing data related to the device.

40. The system of claim 34, wherein access to the at least one node is determined by one or more access rules.

41. The system of claim 34, wherein the M2M devices comprise any of: mobile IoT devices, stationary IoT devices, IoT devices used in manufacturing, and IoT devices used in other industries.

42. The system of claim 29, wherein the IoT devices including M2M devices comprise a vehicle.

43. A computer program product stored on a non-transitory computer readable medium for optimizing device management architecture for IoT devices, wherein the IoT devices include machine to machine (M2M) devices; the computer program product comprising:
a processor, and
a memory in communication with the processor wherein the memory containing program instructions which when executed by the processor, perform the following operations comprising:
providing device information to a server in a master node for registering the device with the master node;
providing rules to assign the device to at least one of the one or more nodes based on the device information, wherein providing rules to assign the device to at least one node further comprises providing rules to change the device assignment from the at least one node to another node based on changes in the device information to keep the device connected to a node;
assigning the device to the at least one of the one or more nodes in response to the rules; and
automatically configuring the device to connect the device to the assigned at least one of the one or more nodes, wherein each node represents a logical entity comprising one or more servers.

44. The computer program product of claim 43, wherein the master node comprises any of: a global master node and a regional master node; and the at least one node includes a regional cluster and a domain node.

45. The computer program product of claim 44, wherein the regional cluster further comprises a regional master node and one or more domain nodes.

46. The computer program product of claim 43, wherein the device information further comprises any of device identification number, location of the device, network access provider, device user name, device subscription and data collected during device usage or a combination thereof.

47. The computer program product of claim 43, wherein each node is connected to the master node for provisioning the device with one or more services.

48. The computer program product of claim 43, wherein each node is independent from other nodes for storing data related to the device.

49. The computer-implemented method of claim 43, wherein access to services assigned to the node is determined by one or more access rules.

50. The method of claim 38, wherein the M2M devices comprise any of: mobile IoT devices, stationary IoT devices, IoT devices used in manufacturing, and IoT devices used in other industries.

51. The computer program product of claim 43, wherein the IoT devices including M2M devices comprise a vehicle.

* * * * *